April 8, 1930.  F. H. OWENS  1,753,622
PHOTOGRAPHIC CAMERA
Filed Oct. 8, 1926  2 Sheets-Sheet 1
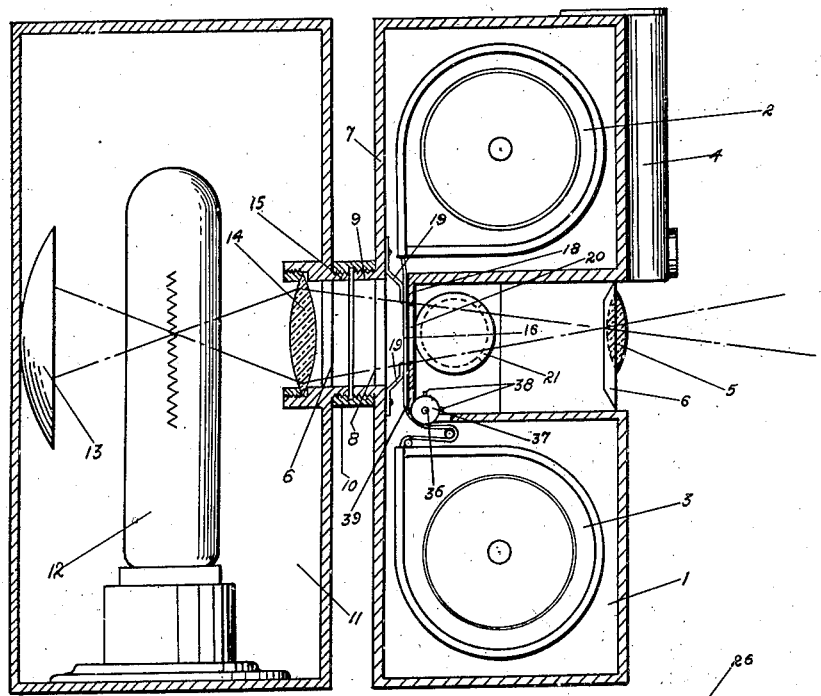
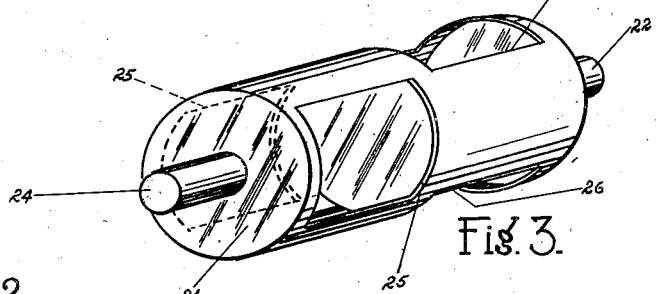
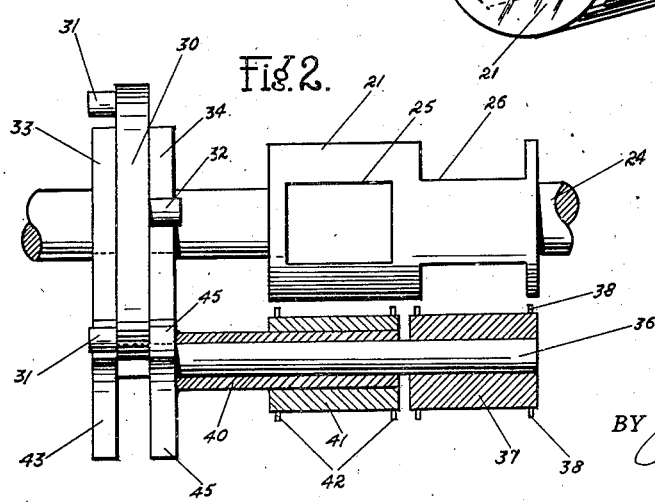
INVENTOR
FREEMAN H. OWENS
BY Philip S. Hopkins
ATTORNEY April 8, 1930. F. H. OWENS 1,753,622
PHOTOGRAPHIC CAMERA
Filed Oct. 8, 1926 2 Sheets-Sheet 2
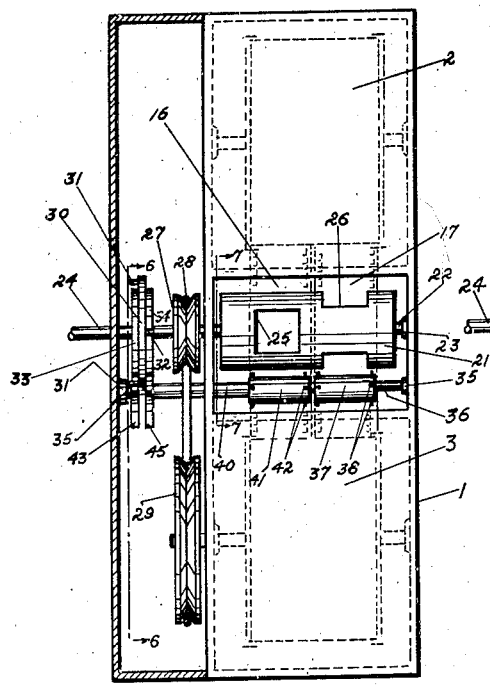

Patented Apr. 8, 1930

1,753,622

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

PHOTOGRAPHIC CAMERA

Application filed October 8, 1926. Serial No. 140,289.

My invention relates to photographic cameras and particularly to that type of camera which may be used both for taking and projecting the images.

The primary object of my invention is to provide such a combined camera and projector having a double lens and adapted to photograph or project images from two separate strips of film within the instrument.

A further object is to provide means for alternately moving, step by step, the strips of film within the instrument.

Still another object is to provide a novel shutter for intermittently covering and uncovering said film strips whereby successive images may be alternately exposed upon or projected through said film strips.

Still another object lies in the provision of novel means for causing the intermittent step by step movement of the film strips.

A still further object lies in the provision of means for co-relating said shutter mechanism and film winding mechanism whereby upon the movement of one of said film strips, the other is stationary and the shutter covers the moving strip and simultaneously opens to the stationary strip.

Other objects and advantages in details of construction and operation will be apparent as the description proceeds, reference being had to the accompanying drawings wherein like reference numerals indicate like parts.

In the drawings:—

Figure 1 is a side view partly in section illustrating the assembled camera and projector.

Figure 2 is a detail view partly in section illustrating the shutter and film winding device.

Figure 3 is a detail perspective of the shutter.

Figure 4 is a front view of the camera with certain parts removed for clearness of illustration.

Figure 5 is a front plan view of the assembled camera.

Figure 6 is a detail side view taken on the line 6—6 of Figure 4.

Figure 7 is a detail sectional view taken on the line 7—7 of Figure 4.

The reference numeral 1 indicates the body of the camera, in the upper and lower portions of which are suitably mounted the film magazines 2 and 3. A view finder 4 is provided on the front of the camera and spaced lenses 5 are suitably mounted also in the front of the camera. Any desirable focusing means for these lenses may be provided. Bellows 6 protect the interior of the camera against light except that which passes through the lenses 5.

The rear side 7 of the camera is provided with an opening 8 in alignment with the lenses 5. A screw threaded boss 9 encircles this opening and is adapted to receive either a closure cap, in the event that the instrument is being used as a taking camera, or a threaded sleeve 10 in the event that the instrument is to be used as a projector. In the latter event, a casing 11 provided with the lamp 12, reflector 13, and condenser lens 14 is secured to the camera casing 1 by means of the threaded sleeve 10 engaging with a threaded boss 15 carried by the casing 11 and encircling an opening 16 in the casing in alignment with the lens 14.

The film magazines 2 and 3 are adapted to receive and hold two separate film strips 16 and 17 preferably perforated in the usual manner along their edges. These film strips lie side by side and are adapted to be pulled from the upper or supply magazine 2 and wound up within the lower or take up magazine 3. These strips of film in their movement between the two magazines in the camera pass downwardly, past the flat surface 18 forming a part of the frame work of the camera. Springs 19 tend to hold the film strips in flat engagement with the surface 18. It will be understood, however, that any desired type or form of film gate mechanism in common use may be substituted for the springs 19, which are intended as illustrative only.

The surface 18 is provided with an opening 20 over which the film strips move, such opening being in direct alignment with the lens 14 and the lenses 5.

Suitably mounted within the camera body directly adjacent the opening 20 is a shutter 21 provided at one end with the short pintle 22 rotatably mounted in the bearing 23 carried by the side of the camera. The opposite end of the shutter is provided with an elongated shaft 24 which extends outwardly through the opposite side of the camera to receive a handle or other suitable means for rotating the shaft. The shutter 21 is preferably in the form of a barrel or cylinder, one-half the length of which is provided with oppositely positioned windows or cutout portions 25 and the other half provided with similar windows or cutaway portions 26 positioned at right angles to the windows 25. It will be understood, therefore, that when the shutter is so positioned that the windows 25 uncover the opening 20 and consequently the film strip 16, the windows 26 will be out of alignment with the opening 20 and the film strip 17 thereby obscuring the same. Upon one-quarter rotation of the shutter the film strip 17 will be uncovered by the windows 26 and the film strip 16 covered by the portion of the shutter lying between the windows 25. Therefore, upon continuous rotation of the shutter 21, it will be understood that the film strips 16 and 17 will be alternately obscured and uncovered with respect to the lenses 5.

The extended pintle or shaft 24 of the shutter carries between the shutter and the side of the camera, a pulley 27 over which runs an endless belt 28 which also passes over a pulley 29 suitably connected with the film reel within the take up magazine 3. Also mounted upon this shaft 24 within the camera is a disk 30 provided on each side near the outer edge thereof with two laterally extending pins 31 and 32. The pins 31 on one side of the disk are spaced 180° apart as are also the pins 32 on the opposite side of the disk. The pins 31 and 32 are so located with respect to each other that there is 90° between each pin 31 and 32. Cams 33 and 34 are also secured to the shaft 24 directly adjacent to and on either side of the disk 30.

Directly below the shutter 21 and extending completely across the camera and suitably journaled as at 35 in either side thereof is a shaft 36. This shaft has secured thereto a sprocket 37 which is provided on either end with four equally spaced sprocket teeth 38 adapted to pass through the opening 39 located in the flat frame member 18 directly below the opening 20, and to engage within the perforations of the film strip 17 whereby upon rotation of said sprocket 37, said film strip may be moved.

Loosely mounted on the shaft 36 is a sleeve 40 carrying at one end directly adjacent the sprocket 37, a sprocket 41 provided at either end with four equally spaced sprocket teeth 42 also adapted to pass through the opening 39 and engage within the perforations of the film strip 16 whereby said strip may be moved upon rotation of the sprocket 41. It may be said here that the film strips 16 and 17 may be wound upon separate reels within the magazine 2 and 3 or may be wound upon a single reel in each magazine as desired. Any suitable means may be also provided for forming a loop in one or the other of said film strips between the supply magazine 2 and the film gate or spring device 19 whereby to provide for the intermittent movement of the two film strips in the event that both are mounted on the same reel. This detail is common in the art and forms no part of this invention.

Means are provided for causing the intermittent rotation of the shaft 36 and the sleeve 40 carrying the two sprockets 37 and 41. Such means includes a star wheel or Geneva member 43 secured to the outer end of the shaft 36. The slots 44 of this star wheel are so positioned as to receive the pins 31 appearing on the outside of the disk 30, whereby upon every complete rotation of the disk 30, said star wheel 43 and consequently the shaft 36 and sprocket 37 will twice rotate one-quarter of a revolution. This results in intermittent movement of the film strip 17.

Secured to the outer end of the sleeve 40 is a second star wheel or Geneva 45, similar to the star 43, so positioned as to be operated by the pins 32 carried on the inside of the disk 30 whereby upon every complete revolution of the disk 30, the sleeve 40 and sprocket 41 will twice be rotated a quarter turn, this intermittently moving the film strip 16. Due to the alternate positioning of the pins 31 and 32 on the disk 30, it will, therefore, be understood that as the disk is rotated with the shutter, there will be an alternate intermittent movement of the sprockets 37 and 41 resulting in an alternate intermittent movement of the film strips 16 and 17.

The size of the disk 30 and therefore the distance between the pins 31 and 32 governs the timing of the movement of the sprockets 37 and 41. This timing is so arranged that one of said sprockets and consequently the film moved by it will be at a complete rest during the time the shutter window or opening is aligned with said film. At this time also the other sprocket and film will be moving to its next rest position for exposure or projection, as the case may be, whereupon the film just exposed or projected is moved.

The effect of the mechanism just described is that pictures may be taken or projected at a much slower rate of speed than in the ordinary use of the single film strip which moves intermittently and the consecutive images taken or projected intermittently. In using my improved apparatus as a projector, the effect of the mechanism just described is to dissolve the view of one strip into the view of the other strip and vice versa as the two strips move alternately and intermittently, thereby eliminating all flicker of the light resulting from the use of the ordinary shutter and single, intermittently moved film strips.

It is believed that the operation of my improved camera and projector is obvious from the foregoing description. It will be understood of course that many changes may be made in details of construction and operation without departing from the scope of my invention. I do not limit myself therefore to the exact form shown other than by the appended claims.

I claim:—

1. A photographic camera comprising a casing, two lenses therein, two strips of film in said casing, one adapted to move past each lens, a tubular shutter mounted for rotation between said lenses and film strips, means on said shutter for alternately uncovering said film strips, and means for alternately moving said strips, said movement taking place only when a strip is obscured from its lens by said shutter, said moving means comprising sprockets engaging said film, and mechanism for intermittently rotating said sprockets, and including a star wheel for each sprocket and means actuated on the rotation of the shutter for alternately engaging and rotating said star wheels.

2. A photographic camera comprising a casing, two lenses therein, two strips of film in said casing, one adapted to move past each lens, a tubular shutter mounted for rotation between said strips and lenses for alternately uncovering said strips, means for alternately moving said strips during the period they are covered by the shutter comprising sprockets engaging said film strips, a star wheel for each sprocket, and a disk rotatable with the shutter and provided with pins alternately engaging and rotating said star wheels.

3. A photographic camera comprising a casing, two film strips therein, a lens for each film strip, means for alternately moving said strips past said lenses, and a lamp housing secured to said camera having a light source in alignment with said film strips and said lenses, a single tubular rotatable shutter between said film strips and said lenses, and means carried by said shutter for alternately obscuring and uncovering said strips whereby the images thereon are alternately projected through said lenses.

4. A photographic camera, comprising a casing, a pair of lenses mounted in said casing, a pair of film strips mounted for traveling movement one across the axis of each of said lenses, a rotatable shutter disposed between said lenses and strips and adapted to uncover said strips alternately, a shaft mounted for rotation in parallel relation to said shutter, means secured to said shaft for rotation therewith and adapted to engage one of said film strips, means mounted for rotation on said shaft and adapted to engage the other film strip, a star-wheel secured to said shaft and a star-wheel secured to said second film-engaging means, and means rotatable with said shutter and adapted to engage said star-wheels alternately during rotation of the shutter thereby to advance said film strips alternately, the shutter and strip-advancing means being synchronized so that while either strip is being moved the shutter is in obscuring position for that strip.

FREEMAN H. OWENS.